United States Patent [19]

Deering

[11] Patent Number: 4,937,785

[45] Date of Patent: Jun. 26, 1990

[54] VISUAL SIGNAL PROCESSING BACKPLANE BUS

[75] Inventor: Michael F. Deering, Mountain View, Calif.

[73] Assignee: Schlumberger Technologies, Inc., San Jose, Calif.

[21] Appl. No.: 312,339

[22] Filed: Feb. 16, 1989

Related U.S. Application Data

[63] Continuation of Ser. No. 815,418, Dec. 31, 1985, abandoned.

[51] Int. Cl.⁵ .............................................. G06F 13/00
[52] U.S. Cl. .................................... 364/900; 364/518; 364/940.61; 364/942.51; 364/957.2
[58] Field of Search ..................... 364/200, 900, 518

[56] References Cited

U.S. PATENT DOCUMENTS

| | | | |
|---|---|---|---|
| 4,099,253 | 7/1978 | Dooley, Jr. | 364/900 |
| 4,250,563 | 2/1981 | Struger | 364/900 |
| 4,293,928 | 10/1981 | Baun | 364/900 |
| 4,309,754 | 1/1982 | Dinwiddie, Jr. | 364/200 |
| 4,313,162 | 1/1982 | Baun et al. | 364/200 |
| 4,322,792 | 3/1982 | Baun | 364/200 |
| 4,373,181 | 2/1983 | Chisholm et al. | 364/200 |
| 4,375,665 | 3/1983 | Schmidt | 364/200 |
| 4,390,963 | 6/1983 | Puhl et al. | 364/200 |
| 4,415,986 | 11/1983 | Chadra | 364/900 |
| 4,459,677 | 7/1984 | Porter et al. | 364/900 |
| 4,574,284 | 3/1986 | Feldman et al. | 340/825.52 |
| 4,745,546 | 5/1988 | Grinberg et al. | 364/200 |
| 4,809,169 | 2/1989 | Sfarti et al. | 364/200 |

*Primary Examiner*—Eddie P. Chan
*Attorney, Agent, or Firm*—David H. Carroll; Robert C. Colwell; Paul C. Haughey

[57] ABSTRACT

A custom bus for a visual signal (image) processing system which can interface with a standard high speed industrial standard computer bus and requires minimal interface circuitry. Eight lines are dedicated to eight data/address bits which are supplied to a bidirectional I/O buffer on each VSP circuit card. A separate board select signal is supplied to each circuit card to enable the I/O buffer. Six bits on six lines provided to each VSP circuit card provide a signal selecting a particular device on each circuit card. Each circuit card contains a decoding circuit for decoding the device select signal and enabling an individual device on the card in response to the device select signal.

1 Claim, 3 Drawing Sheets

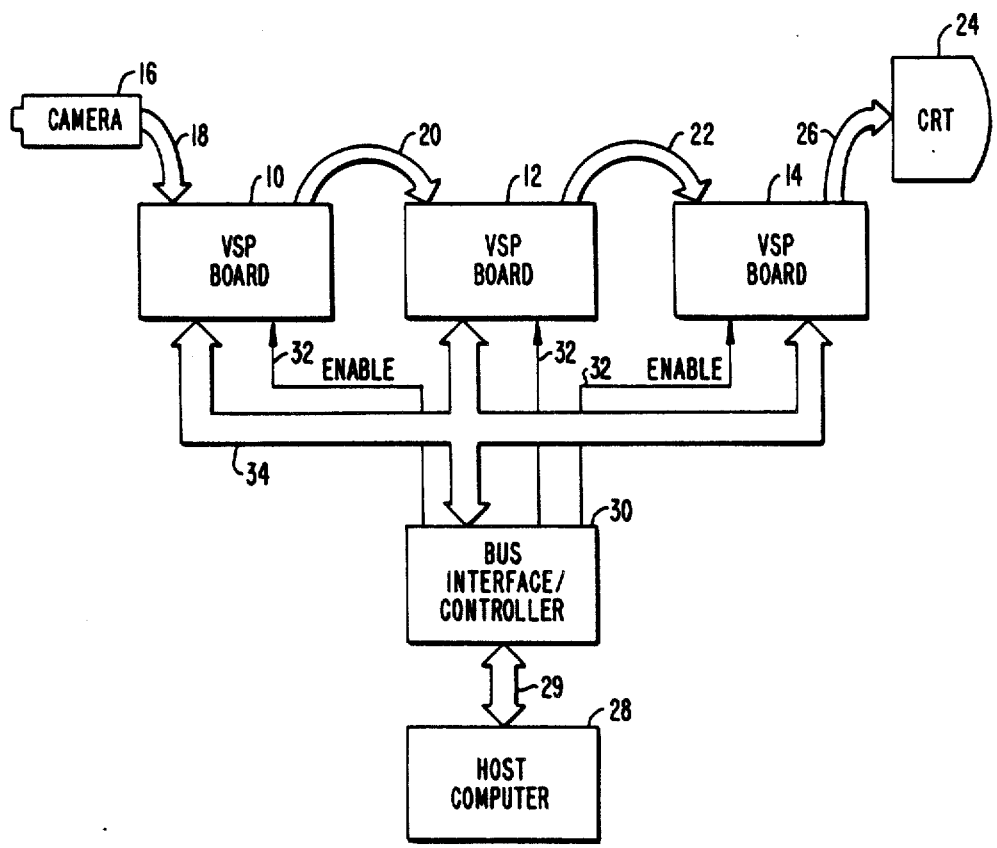
FIG._1.

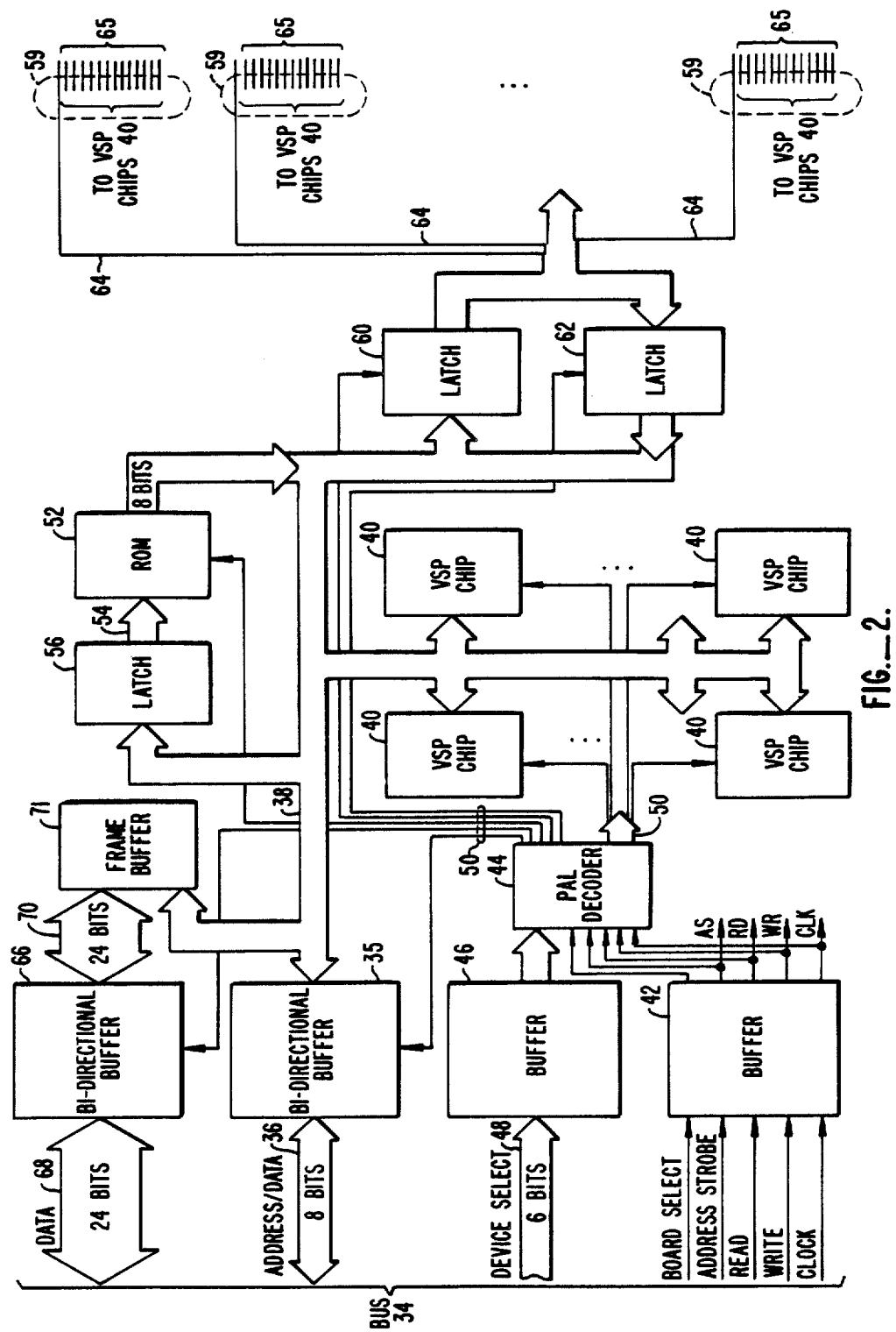
FIG._2.

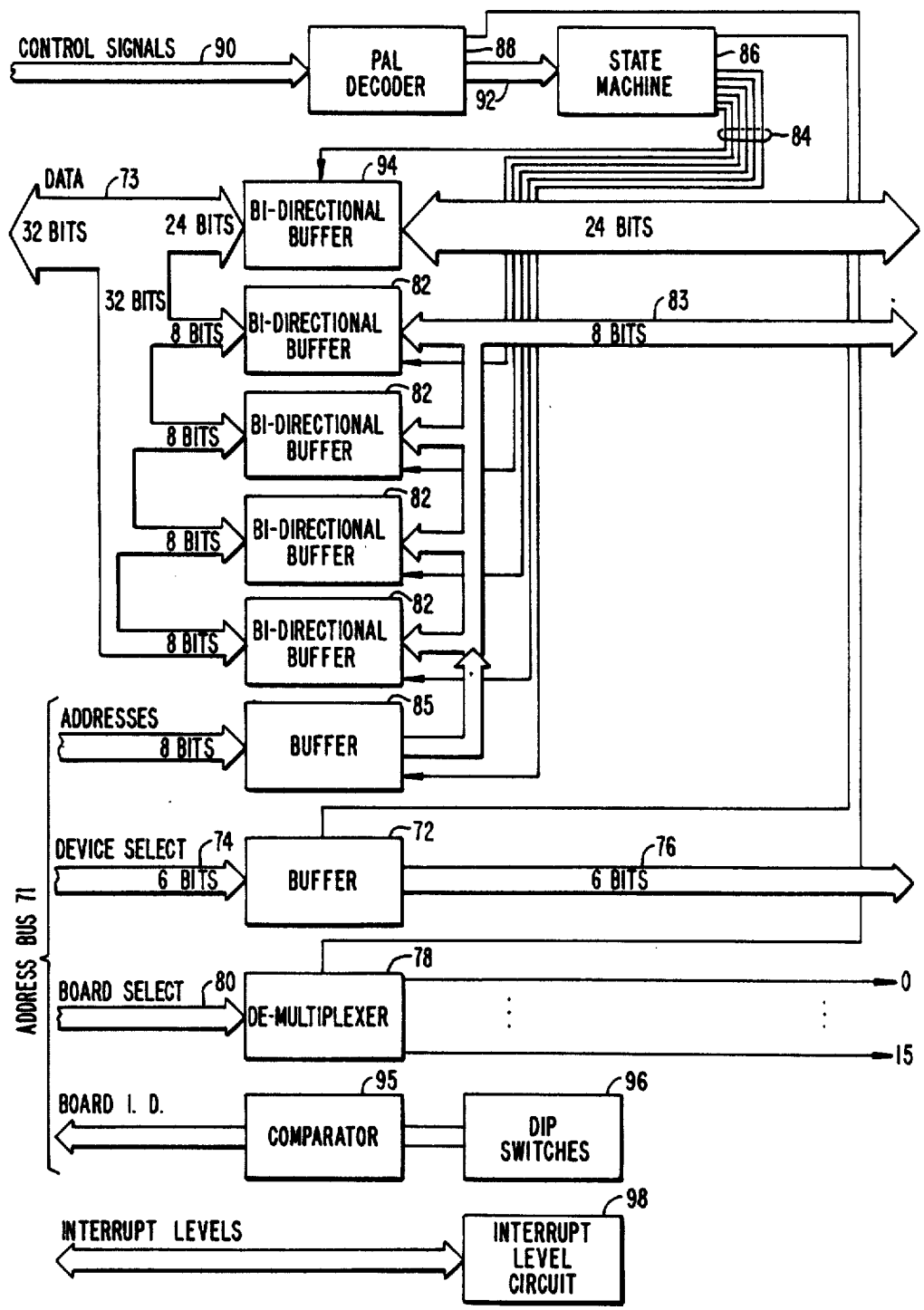
FIG._3.

VISUAL SIGNAL PROCESSING BACKPLANE BUS

This is a continuation of Ser. No. 815,418, filed 12/31/85, now abandoned.

The present invention relates to bus structures for image or visual signal processing (VSP) systems controlled by a computer.

Visual signal processing systems process and analyze images represented by a large number of pixels. Accordingly, a large amount of data is handled requiring a large amount of printed circuit board space for the devices necessary to handle this data. Efforts have been made to integrate the functions of visual signal processing chips to enhance speed and conserve board space (see, i.e., co-pending application serial no. 785,353, filed Oct. 7, 1985). A bus system is required to transfer data representing pixels between visual signal processing cards. In addition, control signals must be supplied to the VSP cards. The reduction in the required board space necessary for the VSP devices is unfortunately offset to some degree by the requirement of a large amount of interface circuitry to couple to a standard computer bus to receive and send control signals.

There are a number of industrial standards for computer buses in widespread use today. The older buses require less interface circuitry, but are relatively slow. Newer buses are faster and more complex and thus require more interface circuitry. Examples of the new buses are the Motorola VME bus and Intel MULTIBUS II.

Most of these faster buses expect each card to monitor traffic on the bus to determine if a particular bus transaction involves that particular card. An alternative would be the use of a card select signal on a separate line to each individual card which is hard-wired into the system. However, this limits the flexibility of the bus by dedicating one card slot in a system as a controller board and limiting the system to a single controller board. The standard buses are designed to handle any type of system that might be plugged into the bus backplane, not simply visual signal processing cards or any other single application.

There is a need for a specialized custom bus for visual signal processing systems which can handle the high speeds of modern standard buses without requiring a large amount of support and interface circuitry on the individual VSP circuit cards.

SUMMARY OF THE INVENTION

The present invention is a custom bus for a visual signal processing system which can interface with standard high speed computer buses and requires minimal interface circuitry. Eight lines are dedicated to eight data/address bits which are supplied to a bidirectional I/0 buffer on each VSP circuit card. A separate board select signal is supplied to each VSP circuit card to enable the I/0 buffer. Six bits on six lines provided to each circuit card provide a signal selecting a particular device on each circuit card. Each circuit card contains a decoding circuit for decoding the device select signal and enabling an individual device on the card in response to the device select signal.

Preferably, each circuit card in the VSP system contains a ROM (read only memory) which stores a code identifying the specific type of the circuit card. This code is preferably stored at location 0 of the ROM (addressed by the eight data/address lines). The ROM can be selected with appropriate board selection and device selection signals. Additionally, the ROM can contain codes identifying revisions of the card or any other information about individual circuit card. This allows a controlling system to verify via software that a set of VSP boards have been correctly physically configured, as well as to identify what type of boards are installed.

The VSP circuit cards also preferably contain a separate data path for pixels which path may be provided by patch cables to configure the cards as desired. By including a sense line at each patch cable connection and alternatively activating a sense signal at patch cable connections at each of the other cards, the particular cable connections of a card can be remotely sensed and determined. Thus, software could be used to verify that the correct configuration of patch cables has been assembled.

While it is usually desirable to process pixel data along a separate patch cable bus, it may on occasion be necessary to send pixel data to or from a host computer through a control bus interface. An additional 24 data lines are thus provided to each circuit card to give a total of 32 data lines when the 8-bit data/address lines are included. A stream of bits representing pixel data can thus be sent quickly on or off the VSP board. A high speed transfer of data can be achieved by sending only data without intervening address information. The data can be sequentially loaded with the only address information required being the beginning and end points of the data stream. This can be done because the data represent successive addresses corresponding to successive pixels in an image.

An interface board is used to couple the custom bus of the present invention to an industry standard computer bus. The interface board has a buffer for accepting the device select signals and a multiplexer for providing the individual board select signals from a binary code indicating the particular board. In addition, the interface board has circuitry for accepting either multiplexed 8-bits of data and 8-bits of address or up to 32 bits of data.

A control signal decoder picks out only the control signals from the standard bus which are necessary for a VSP system. The selected control signals are then supplied to a state machine which generates the sequence of control signals necessary for the interface board to supply control signals, data and addresses to the individual VSP boards. In addition, the state machine converts control signals to select either a data streaming mode or a multiplexed address/data mode of communication. In the multiplexed mode, 32 bits of data from the standard bus are provided to four buffers. The outputs of the buffers are then enabled in sequence to provide 8 bits on each VSP board cycle to the individual circuit cards. The eight bits of address are supplied via a buffer to the custom bus in between data transfers. When data is being sent from the circuit cards to the host computer through the standard bus, this process is reversed with 8 bits at a time being latched into the four buffers and then up to 32 bits being supplied at once to the standard bus. In the streaming mode, a separate set of buffers are enabled with the 32 bits being supplied simultaneously to the four buffers and to the standard bus.

The present invention provides a standard bus for VSP systems on a single physical and electrical backplane structure.

Additionally, the invention will:

allow eventual connection to any of the major industrial computer bus standards;

minimize the amount of required per board bus interface logic;

make it possible for the controlling system to verify the backplane positions, cabling, strappings, and installed options in the boards in the system;

allow for high speed/high throughput operation;

provide a software friendly interface at the external bus level; and support only those bus features likely to be actually needed by VSP chip based computer vision boards.

For a further understanding of the nature and advantages of the invention, reference should be made to the ensuing detailed description taken in conjunction with the accompanying drawings.

BRIEF DESCRIPTION OF THE DRAWINGS

FIG. 1 is a block diagram of an example of a VSP system utilizing the bus structure of the present invention;

FIG. 2 is a block diagram of the interface circuitry on an individual VSP circuit card according to the present invention; and FIG. 3 is a block diagram of an interface/controller board for interfacing between a standard bus and the custom bus of the present invention.

DETAILED DESCRIPTION OF THE PREFERRED EMBODIMENTS

FIG. 1 is a block diagram of a sample VSP system utilizing a bus structure according to the present invention. A number of VSP cards, 10, 12 and 14 are shown. VSP card 10 is coupled to a camera 16 through a patch cable 18. Cards 10 and 12 are coupled together via a patch cable 20, cards 12 and 14 are coupled together via a patch cable 22, and card 14 is coupled to a CRT (cathode ray tube) 24 via a patch cable 26. Pixel data is thus provided from camera 16 to CRT 20 via the patch cable path wherein it is processed by the VSP chips on the individual cards 10, 12 and 14. In a typical system, each card provides one or more image processing functions—contrast enhancement, pattern recognition, image correlation, etc. A usual system might have many more cards, 3 are shown for simplicity. Also, multiple patch cable connections may be provided on each card.

A host computer 28 provides signals via a standard bus 29 to a bus interface card 30 which is coupled to the custom bus 34 of the present invention. Bus interface 30 provides separate card enable signals 32 to each of VSP boards 10, 12 and 14. In addition, lines 34 provide data, address and control signals to all the VSP boards.

FIG. 2 is a block diagram of the interface circuitry on a VSP circuit board according to the present invention for coupling to bus 34. A bidirectional buffer 35 receives 8 bits of address or data from an 8 line bus 36. These 8 bits are supplied via an internal bus 38 to individual VSP chips 40 on the board where the pixel data may be processed. The individual VSP chips 40 could be correlator chips, histogram chips, delay chips, convolve chips, etc. See, i.e., copending applications Ser. Nos. 785,353, and 785,351 now U.S. Pat. No. 4,754,412 filed Oct. 7, 1985 and entitled "Bitplane Area Correlator" and "Arithmetic Logic System", respectively. Control signals are supplied to the board through a buffer 42 which receives a board select signal, address strobe, read signal, write signal and clock signal. These signals are decoded by a PAL (programmable array logic) 44. The appropriate control signals are then sent to the other devices on the board.

Optionally, a bidirectional buffer 66 interfaces with an additional 24 data lines 68 which can give a total of 32 data lines when combined with 8 lines 36 in the streaming mode. These 24 data lines are provided through an internal bus 70 to certain individual devices, typically a frame buffer 71 on the board.

A buffer 46 receives a 6 bit device select signal 48 and provides it to PAL 44 where it is decoded to provide individual device select signals on lines 50 to the individual devices on the board.

A ROM 52 (which stores a code identifying the board configuration) is coupled via address line 54 to a latch 56 which receives data from address/data bus 38. An 8 bit code from ROM 52 is provided to address/data bus 38 at the output of ROM 52.

A series of patch cable connectors 59 allow interconnections between boards as shown in FIG. 1. A sense line 64 is coupled to one pin of each connector 59. A pair of latches 60 and 62 provide data to and from, respectively, a series of sense lines 64.

The VSP PC Bus according to the present invention provides flexibility by providing patch cable connections 59 between modular vision boards.

In operation, different VSP boards can be inserted into a backplane and interconnected with patch cables between multiple pin connectors 59 to couple the cards together for a pixel data path. The lines 65 are coupled to various VSP chips 40 in accordance with the particular configuration of the VSP board. One of the pins is a sense wire 64 which is provided to latches 60, 62. Latch 60 has tri-state driver outputs which are turned on during a verification mode. Latches 62 in the remaining cards are then read in sequence to determine where the wire is connected. A host computer can thus remotely determine the patch cable connections between individual boards. Software can directly determine the connectivity of a set of wired VSP boards, verify this connectivity against the desired design, and report any errors in cabling.

To be applicable to a wide variety of tasks, vision systems need to be flexible in their configuration. A modular architecture can provide for any different specialized needs, but at the cost of increased complexity in system configuration.

In addition, the host computer can verify the configuration of an individual circuit board from data stored in ROM 52 (which is always the first device addressable on the board as discussed below.) This enables a controlling system to verify via software that the correct boards are in the assigned slots. Preferably, the board type is stored in address 0 of the ROM and the revision number of the board is stored in address 1 of the ROM. Other information can be stored in other addresses of the ROMs, such as any jumpers used to change the configuration of the board or any differences in the components used for devices on the board. The ROM is accessed like any other device on the board, but with only 5 address bits being required. The address bits are first stored in latch 56 so that the data from ROM 52 can be supplied to address/data bus 38 on a succeeding clock cycle without interfering with the address information.

After the configuration and connections of the VSP boards have been verified with the ROM and connectivity devices, data and addresses can be provided to and read from the rest of the devices on the boards. The board select signal provides an enabling signal to the buffers for inputting data to the board. An individual device to be enabled is enabled by a code on device select lines 48 to buffer 46. PAL 44 decodes the device select signal and provides an enabling signal to the selected device via the appropriate line 50. PAL 44 provides up to 64 device selections from the 6-bit input. The selections include enabling ROM 52 for board identification and enabling latches 60, 62 for patch cable verification. To be able to identify an arbitrary VSP board, the ROM must be located at same device selection address on each board, preferably at device address 0. The patch cable connectivity latches are usually at address 1 for software coding convenience. The address strobe is used to indicate whether address information or data is being supplied during any particular clock cycle.

When it is desirable to provide 32 bits of data in parallel to or from the board, buffer 66 is enabled. 24 bits are provided through buffer 66 with the remaining 8 bits being provided through buffer 35 to give a 32 bit parallel output or input. Buffer 66 can also be used in a "streaming" mode, when a stream of data is provided without intervening address information. Any width of data bytes up to 32 bits can be used in this streaming mode. This mode would typically be used when communicating with a frame buffer 71.

FIG. 3 is a block diagram of the bus interface/controller circuit 30 of FIG. 1. An industry standard host address bus 71 provides 24 to 32 address bits to controller 30. Address bus 71 could be combined with data bus 73, with address and data information being multiplexed. Four bits go to the board select lines 80, six bits go to device select lines 74, 8 bits provide an address within an individual device to buffer 85 and 6-14 bits are used for the address of controller board 30 in the host bus system and are coupled to a comparator 95 which in turn is coupled to DIP switches 96. A buffer 72 receives a 6 bit device select code on lines 74 and provides them to the VSP boards via lines 76. Buffer 72 is needed because bus interface 30 is an asynchronous interface. A demultiplexer 78 receives 4 bits on lines 80 designating a particular VSP board and provides a board select signal on one of 16 output lines to a particular VSP board.

Four 8-bit buffers 82 are used to multiplex data onto and off of the individual VSP boards. VSP chips usually require multiplexing to alternately supply either data or address information each clock cycle. This multiplexing circuitry is contained on the interface card and is thus eliminated from the individual VSP circuit boards. Buffers 82 are controlled by control signals 84 from a state machine 86. State machine 86 receives control signals from PAL decoder 88. In operation, PAL decoder 88 will receive a large number of control signals 90 from the standard bus and will collapse them into the five control signals needed for the VSP cards on lines 92. These signals 92 are provided to state machine 86 which consists of latches and ROMs which are programmed to provide the signals needed by the VSP boards and buffers 82. The programming will differ for each particular standard bus conversion to the custom bus. Thus, the state machine will be programmed differently for a VME bus than for a MULTIBUS II bus to give the same control signals 84. State machine 86 will also provide the response signals needed by the particular standard bus being interfaced with.

A separate bidirectional buffer 94 is used to provide 32 bits to and from the individual VSP boards. In operation, in the multiplexing mode, 32 bits can be loaded in parallel to buffers 82. The byte wide buffers 82 are then sequentially enabled to provide 8 bits at a time to the individual VSP cards on lines 83. If a 32 bit operation is to be used, all but one of buffers 82 are disabled and buffer 94 is enabled to provide a total of 32 bit parallel processing. When data is supplied from the VSP boards to the standard bus, each of buffers 82 is sequentially enabled to load four successive 8-bit data transfers. After all four buffers 82 are loaded, all of buffers 82 are simultaneously enabled to provide 32 bits of data to the standard bus. Alternately, a combination of less than 32 bits could be used if required by the standard bus or if only a lesser width of data bytes need transferring.

Address information is provided to lines 83 via a separate buffer 85. The standard bus can have either multiplexed address and data or separate data and address lines (as shown in the example of FIG. 3), thus requiring a separate buffer 85.

In addition, the controller board will contain other devices necessary for interfacing the particular standard bus being used. For instance, for a VME bus connection, a number of board switches 96 inform the system of the address location of the controller board with respect to the VME bus. An interrupt level circuit 98 is used to provide a code indicating that this interface board is the one providing interrupts to the VME bus. Interrupt level circuit 98 also contains a 4-bit magnitude comparator to determine the priority of the originator of other interrupts on the VME bus.

The circuitry used on the interface board minimizes the amount of interface logic required on the individual VSP circuit boards. The bus features supported by the interface board are only those likely to be needed by a VSP chip-based computer vision board. Thus, the interface board allows for high-speed and high throughput operation by customizing a standard bus to provide a custom VSP bus. The use of board select signals from the interface card dictates that a single dedicated controller/interface board be used. This is, however, a preferred method of operation for VSP boards which would all be slave boards to a single controller/interface board.

While individual VSP chips have only 8 bit data paths to and from the VSP custom bus, most VSP chips have internal registers that are multiple bytes wide (16, 24 or 32 bits) in addition to simple 8-bit registers. Most buses that the system of the present invention will be connected to support 16 bit or even 32 bit data transfers (though usually at lower speed and/or through-put than the VSP bus data cycle used in the present invention). The interface/ controller board shown in FIG. 3 can support the illusion of a simultaneous 16 or 32 bit data transfer from a host bus to a VSP chip on a VSP circuit board. This is done by translating the, i.e., 32-bit host bus data into 4 VSP bus 8-bit data transfers to successive VSP register chip locations.

As will be understood by those familiar with the art, the present invention can be embodied in other forms without departing from the spirit or essential characteristics thereof. For example, a device other than a ROM could be used to store the board identification number. Alternatively, devices other than PALs could be employed for the device selection and state machine circuits (demultiplexers, gate arrays, standard logic, etc.). Accordingly, the foregoing embodiments are intended to be illustrative of, but not limiting of, the scope of the invention, which is set forth in the following claims.

I claim:

1. A system for configuring and interconnecting a plurality of visual signal processing boards, each board including a plurality of visual signal processing chips, said system comprising:

an external processor bus;

an internal processor bus coupled to said visual signal processing chips;

a first I/O buffer coupled between said internal processor bus and said external processor bus, for storing address and data information input from or output to said external processor bus;

at least one internal pixel data bus coupling together data I/O lines of a plurality of said visual signal processing chips;

a second I/O buffer coupling said internal processor bus to said internal pixel data bus;

means for receiving a board select signal from an external processor on said external processor bus and enabling said second I/O buffer to input and output data in response to said board select signal;

device select means for decoding a device select signal from an said external processor bus and enabling one of said visual signal processing chips on said board in response to said device select signal;

a plurality of I/O pixel data connectors, at least one of said I/O connectors being coupled to said internal pixel data bus, each of said I/O connectors having a plurality of lines, one of said lines being a sense line;

means for providing a signal to each said sense line responsive to a control signal from said internal processor bus; and means for detecting a signal on each said sense line and providing a detect signal to said internal processor bus;

wherein a plurality of said visual signal processing boards are coupled in series through said I/O pixel data connectors, a first one of said visual signal processing boards being coupled to a source of pixel data, all of said boards being coupled in parallel to said external processor bus.

* * * * *